(12) United States Patent
Chauvel et al.

(10) Patent No.: US 7,111,177 B1
(45) Date of Patent: Sep. 19, 2006

(54) SYSTEM AND METHOD FOR EXECUTING TASKS ACCORDING TO A SELECTED SCENARIO IN RESPONSE TO PROBABILISTIC POWER CONSUMPTION INFORMATION OF EACH SCENARIO

(75) Inventors: Gerard Chauvel, Antibes (FR); Dominique Benoit Jacques D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 524 days.

(21) Appl. No.: 09/696,052

(22) Filed: Oct. 25, 2000

(30) Foreign Application Priority Data

Oct. 25, 1999 (EP) .................................. 99402655

(51) Int. Cl.
*G06F 1/26* (2006.01)
*G06F 1/32* (2006.01)

(52) U.S. Cl. ...................................... 713/300; 713/320
(58) Field of Classification Search ................ 713/300, 713/322, 340, 320; 712/216, 214, 217, 220, 712/245; 709/104; 718/100, 102, 104
See application file for complete search history.

(56) References Cited

U.S. PATENT DOCUMENTS

| 3,593,300 | A | * | 7/1971 | Driscoll et al. | ............. | 709/104 |
| 5,099,421 | A | * | 3/1992 | Buerkle et al. | ............. | 712/216 |
| 5,894,579 | A | * | 4/1999 | Fujihara | ..................... | 713/324 |
| 6,173,408 | B1 | * | 1/2001 | Jimbo et al. | ................ | 713/322 |
| 6,367,023 | B1 | * | 4/2002 | Kling et al. | ................ | 713/340 |

FOREIGN PATENT DOCUMENTS

| EP | 0 683 451 A2 | 5/1995 |
| EP | 0 730 217 A1 | 2/1996 |
| EP | 0 794 481 A2 | 3/1997 |
| EP | 0 921 458 A2 | 12/1998 |
| JP | 08101777 A * | 4/1996 |
| JP | 10040144 A * | 2/1998 |
| JP | 11203145 A * | 7/1999 |
| WO | PCT WO 94/11801 | 11/1993 |

OTHER PUBLICATIONS

Patterson, David A and Hennessey, John L, Computer Architecture A Quantitative Approach, 1996, Morgan Kaufmann Publishers, Inc., 2nd Ed, pp. 240-243.*

* cited by examiner

*Primary Examiner*—Chun Cao
*Assistant Examiner*—Mark Connolly
(74) *Attorney, Agent, or Firm*—Ronald O. Neerings; Wade James Brady, III; Frederick J. Telecky, Jr.

(57) ABSTRACT

A distributed processing system (10) includes a plurality of processing modules, such as MPUs (12), DSPs (14), and coprocessors/DMA channels (16). Power management software (38) in conjunction with profiles (36) for the various processing modules and the tasks to executed are used to build scenarios which meet predetermined power objectives, such as providing maximum operation within package thermal constraints or using minimum energy. Actual activities associated with the tasks are monitored during operation to ensure compatibility with the objectives. The allocation of tasks may be changed dynamically to accommodate changes in environmental conditions and changes in the task list.

24 Claims, 8 Drawing Sheets

SYSTEM AND METHOD FOR EXECUTING TASKS ACCORDING TO A SELECTED SCENARIO IN RESPONSE TO PROBABILISTIC POWER CONSUMPTION INFORMATION OF EACH SCENARIO

This application claims priority under 35 U.S.C. §119(e)(1) of European Patent Application Number 99402655.7, filed Oct. 25, 1999, the entirety of which is incorporated herein by reference.

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to integrated circuits and, more particularly, to managing power in a processor.

2. Description of the Related Art

For many years, the focus of processor design, including designs for microprocessor units (MPUs), co-processors and digital signal processors (DSPs), has been to increase the speed and functionality of the processor. Presently, power consumption has become a serious issue. Importantly, maintaining low power consumption, without seriously impairing speed and functionality, has moved to the forefront in many designs. Power consumption has become important in many applications because many systems, such as smart phones, cellular phones, PDAs (personal digital assistants), and handheld computers operate from a relatively small battery. It is desirable to maximize the battery life in these systems, since it is inconvenient to recharge the batteries after short intervals.

Currently, approaches to minimizing power consumption involve static power management; i.e., designing circuits which use less power. In some cases, dynamic actions have been taken, such as reducing clock speeds or disabling circuitry during idle periods.

While these changes have been important, it is necessary to continuously improve power management, especially in systems where size and, hence, battery size, is important to the convenience of using a device.

In addition to overall power savings, in a complex processing environment, the ability to dissipate heat from the integrated circuit becomes a factor. An integrated circuit will be designed to dissipate a certain amount of heat. If tasks require multiple systems on the integrated circuit to draw high levels of current, it is possible that the circuit will overheat, causing system failure.

In the future, applications executed by integrated circuits will be more complex and will likely involve multiprocessing by multiple processors, including MPUs, DSPs, coprocessors and DMA channels in a single integrated circuit (hereinafter, a "distributed processing system"). DSPs will evolve to support multiple, concurrent applications, some of which will not be dedicated to a specific DSP platform, but will be loaded from a global network such as the Internet. Accordingly, the tasks that a distributed processing system will be able to handle without overheating will become uncertain.

Accordingly, a need has arisen for a method and apparatus for managing power in a circuit without seriously impacting performance.

BRIEF SUMMARY OF THE INVENTION

The present invention provides a method and apparatus for controlling the execution of tasks in a processor comprising a plurality of processing modules. Consumption information is calculated based on probabilistic values for activities associated with the tasks. Tasks are then executed on the processing modules responsive to the consumption information.

The present invention provides significant advantages over the prior art. First, it provides for a fully dynamic power management. As the tasks executed in the processing system change, the power management software can build new scenarios to ensure that thresholds are not exceeded. Further, as environmental conditions change, such as battery voltages dropping, the power management software can re-evaluate conditions and change scenarios, if necessary. Second, the power management software is transparent to the various tasks that it controls. Thus, even if a particular task does not provide for any power management, the power management software assumes responsibility for executing the task in a manner that is consistent with the power capabilities of the processing system. Third, the overall operation of the power management software can be used with different hardware platforms, with different hardware and tasks accommodated by changing profiles used for making the power calculations.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–9 of the drawings, like numerals being used for like elements of the various drawings.

Figure 1:
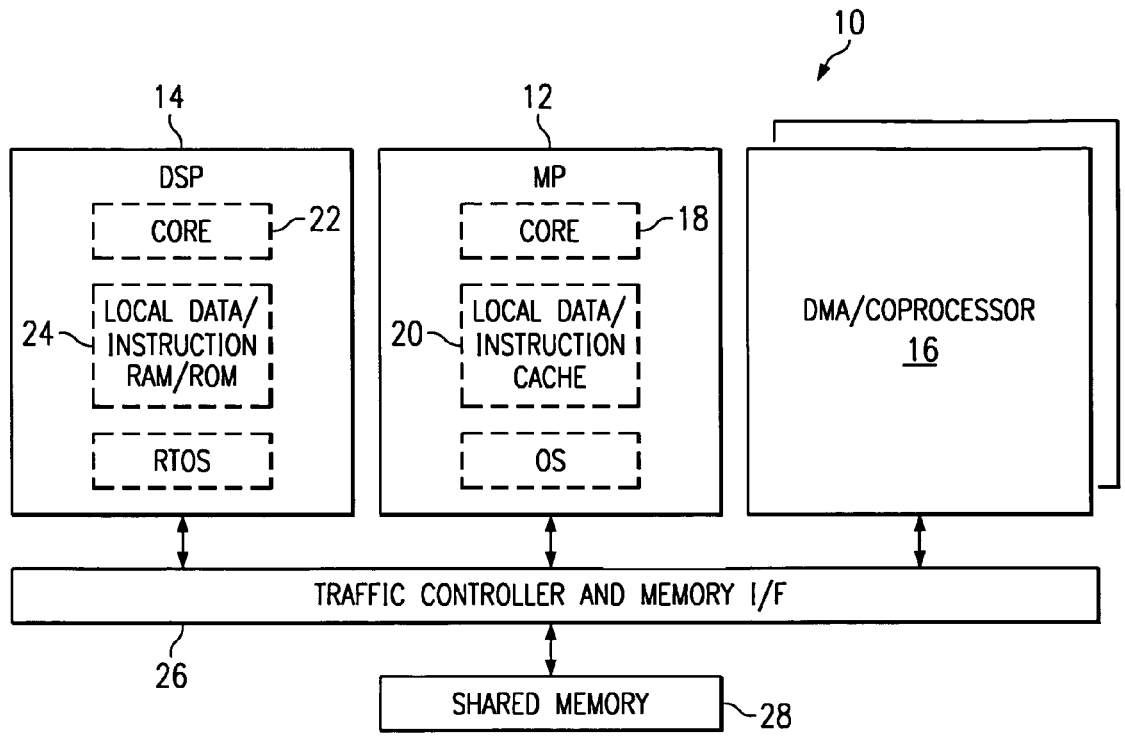
FIG. 1 illustrates a block diagram of a distributed processing system.

FIG. 1 illustrates a general block diagram of a general distributed processing system 10, including an MPU 12, one or more DSPs 14 and one or more DMA channels or coprocessors (shown collectively as DMA/Coprocessor 16). In this embodiment, MPU 12 includes a core 18 and a cache 20. The DSP 14 includes a processing core 22 and a local memory 24 (an actual embodiment could use separate instruction and data memories, or could use a unified instruction and data memory). A memory interface 26 couples a shared memory 28 to one or more of the MPU 12, DSP 14 or DMA/Coprocessor 16. Each processor (MPU 12, DSPs 14) can operate in full autonomy under its own operating system (OS) or real-time operating system (RTOS) in a real distributed processing system, or the MPU 12 can operate the global OS that supervises shared resources and memory environment.

Figure 2:
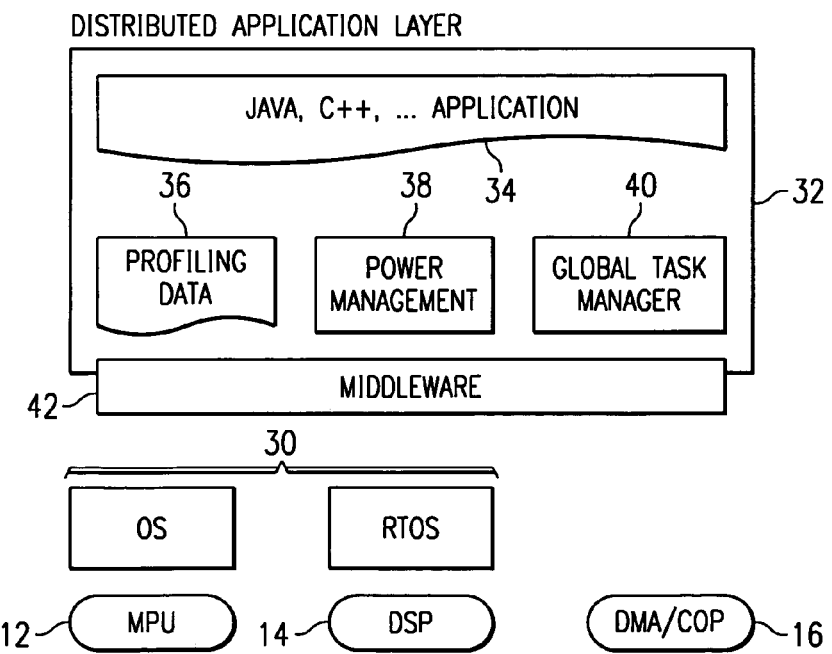
FIG. 2 illustrates a software layer diagram for the distributed processing system.

FIG. 2 illustrates a software layer diagram for the distributed processing system 10. As shown in FIG. 1, the MPU 12 executes the OS, while the DSP 14 executes an RTOS. The OS and RTOSs comprise the OS layer 30 of the software. A distributed application layer 32 includes JAVA, C++ and other applications 34, power management tasks 38 which use profiling data 36 and a global tasks scheduler 40. A middleware software layer 42 communicates between the OS layer 30 and the applications in the distributed application layer 32.

Referring to FIGS. 1 and 2, the operation of the distributed processing system 10 is discussed. The distributed processing system 10 can execute a variety of tasks. A typical application for the distributed processing system 10 would be in a smartphone application where the distributed processing system 10 handles wireless communication, video and audio decompression, and user interface (i.e., LCD update, keyboard decode). In this application, the different embedded systems in the distributed processing system 10 would be executing multiple tasks of different priorities. Typically, the OS would perform the task scheduling of different tasks to the various embedded systems.

The present invention integrates energy consumption as a criterion in scheduling tasks. In the preferred embodiment, the power management application 38 and profiles 36 from the distributed applications layer 32 are used to build a system scenario, based on probabilistic values, for executing a list of tasks. If the scenario does not meet predetermined criteria, for example if the power consumption is too high, a new scenario is generated. After an acceptable scenario is established, the OS layer monitors the hardware activity to verify that the activity predicted in the scenario was accurate.

The criteria for an acceptable task scheduling scenario could vary depending upon the nature of the device. One important criterion for mobile devices is minimum energy consumption. As stated above, as electronic communication devices are further miniaturized, the smaller battery allocation places a premium on energy consumption. In many cases during the operation of a device, a degraded operating mode for a task may be acceptable in order to reduce power, particularly as the batteries reach low levels. For example, reducing the LCD refresh rate will decrease power, albeit at the expense of picture quality. Another option is to reduce the MIPs (millions of instructions per second) of the distributed processing system 10 to reduce power, but at the cost of slower performance. The power management software 38 can analyze different scenarios using different combinations of degraded performance to reach acceptable operation of the device.

Another objective in managing power may be to find the highest MIPs, or lowest energy for a given power limit setup.

Figure 3A:
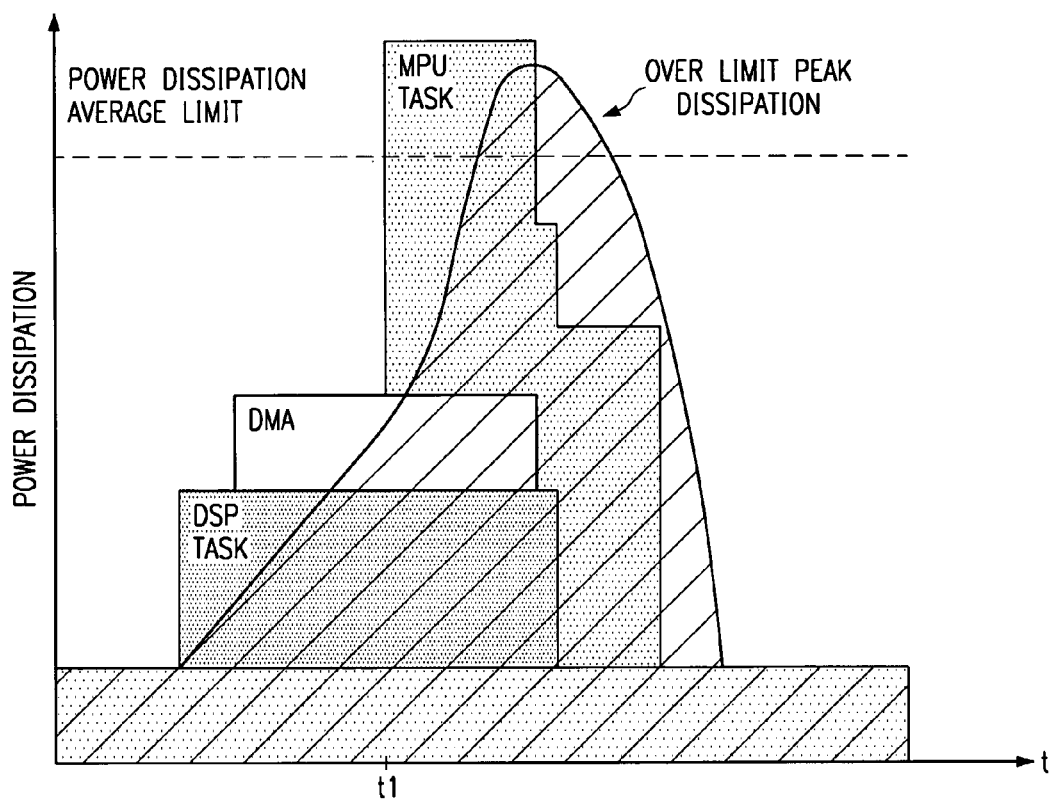
FIG. 3 illustrates an example showing the advantages of power management for a distributed processing system.
Figure 3B:
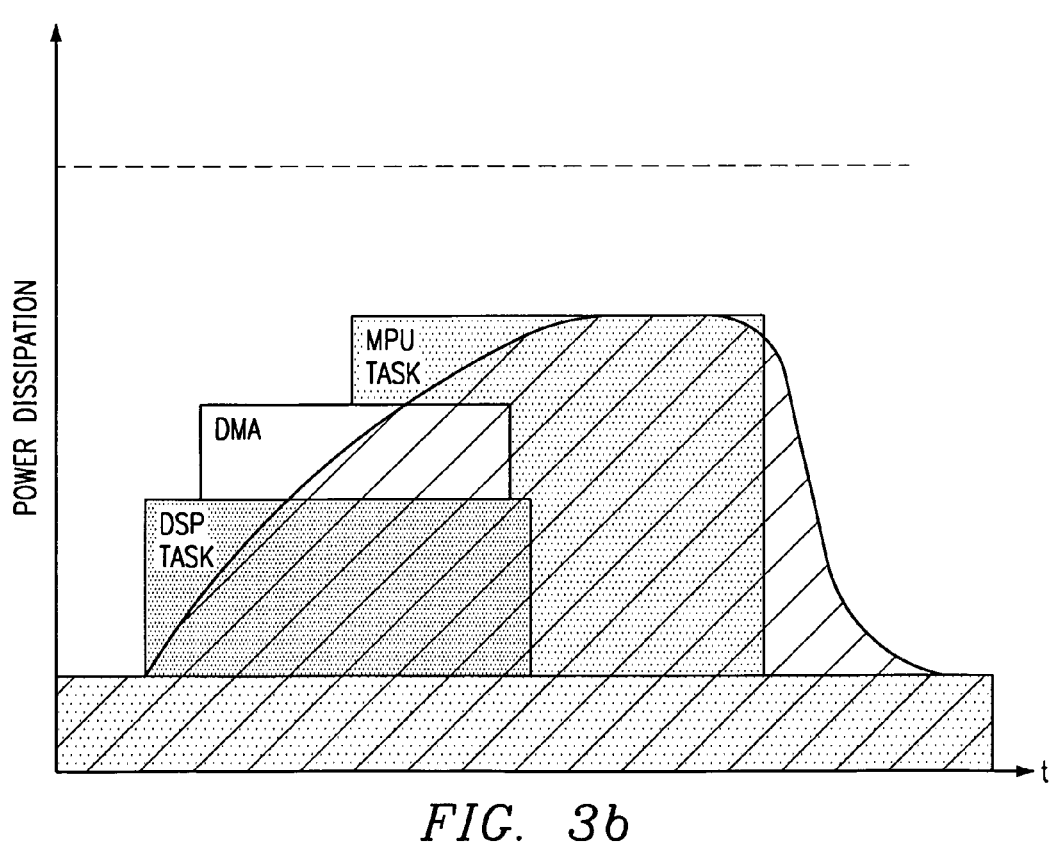

FIGS. 3a and 3b illustrate an example of using the power management application 38 to prevent the distributed processing system 10 from exceeding an average power dissipation limit. In FIG. 3a, the DSP 14, DMA 16 and MPU 12 are concurrently running a number of tasks. At time t1, the average power dissipation of the three embedded systems exceeds the average limit imposed on the distributed processing system 10. FIG. 3b illustrates a scenario where the same tasks are executed; however, an MPU task is delayed until after the DMA and DSP tasks are completed in order to maintain an acceptable average power dissipation profile.

Figure 4A:
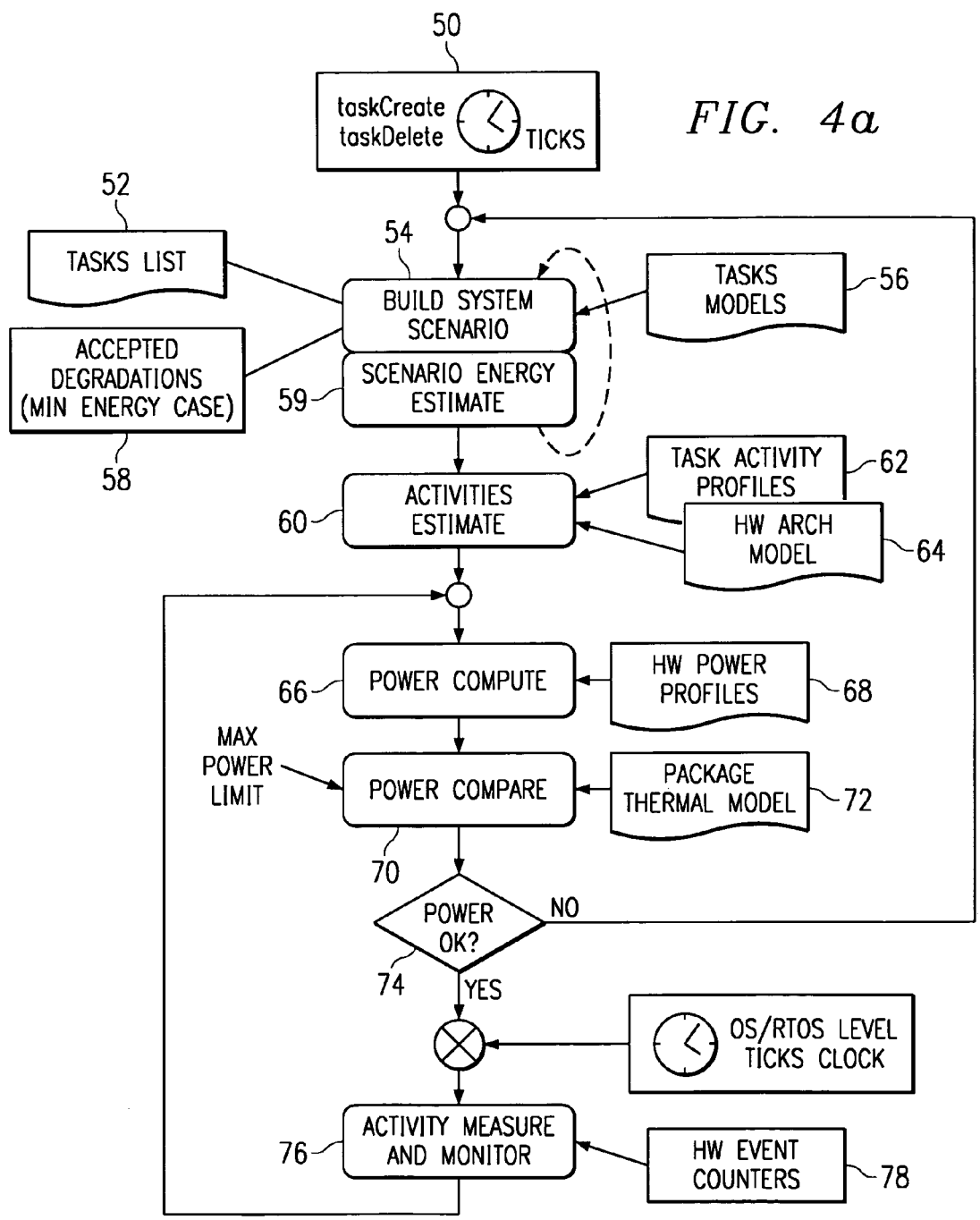
FIGS. 4a and 4b illustrate flow diagrams showing preferred embodiments for the operation of the power management software of FIG. 2.

FIG. 4a illustrates a flow chart describing operation of a first embodiment of the power management tasks 38. In block 50, the power management tasks are invoked by the global scheduler 40, which could be executed on the MPU 12 or one of the DSPs 14; the scheduler evaluate the upcoming application and splits it into tasks with associated precedence and exclusion rules. The task list 52 could include, for example, audio/video decoding, display control, keyboard control, character recognition, and so on. In step 54, the task list 52 is evaluated in view of the task model file 56 and the accepted degradations file 58. The task model file 56 is part of the profiles 36 of the distributed applications layer 32. The task model file 56 is a previously generated file that assigns different models to each task in the task list. Each model is a collection of data, which could be derived experimentally or by computer aided software design techniques, which defines characteristics of the associated task, such as latency constraints, priority, data flows, initial energy estimate at a reference processor speed, impacts of degradations, and an execution profile on a given processor as a function of MIPs and time. The degradation list 58 sets forth the variety of degradations that can be used in generating the scenario.

Each time the task list is modified (i.e., a new task is created or a task is deleted) or when a real time event occur, based on the task list 52 and the task model 56 in step 54, a scenario is built. The scenario allocates the various tasks to the modules and provides priority information setting the priority with which tasks are executed. A scenario energy estimate 59 at a reference speed can be computed from the tasks' energy estimate. If necessary or desirable, tasks may be degraded; i.e., a mode of the task that uses fewer resources may be substituted for the full version of a task. From this scenario, an activities estimate is generated in block 60. The activities estimate uses task activity profiles 62 (from the profiling data 36 of the distributed application layer 32) and a hardware architectural model 64 (also from the profiling data 36 of the distributed application layer 32) to generate probabilistic values for hardware activities that will result from the scenario. The probabilistic values include each module's wait/run time share (effective MHz), accesses to caches and memories, I/O toggling rates and DMA flow requests and data volume. Using a period T that matches the thermal time constant, from the energy estimate 59 at a reference processor speed and the average activities derived in step 60 (particularly, effective processors speeds), it is possible to compute an average power dissipation that will be compared to thermal package model. If the power value exceeds any thresholds set forth in the package thermal model 72, the scenario is rejected in decision block 74. In this case, a new scenario is built in block 54 and steps 60, 66 and 70 are repeated. Otherwise, the scenario is used to execute the task list.

During operation of the tasks as defined by the scenario, the OS and RTOSs track activities by their respective modules in block 76 using counters 78 incorporated in the hardware. The actual activity in the modules of the distributed processing system 10 may vary from the activities estimated in block 60. The data from the hardware counters are monitored on a T periodic basis to produce measured activity values. These measured activity values are used in block 66 to compute an energy value for this period, and hence, an average power value in block 66, as described above, and are compared to the package thermal model in block 72. If the measured values exceed thresholds, then a new scenario is built in block 54. By continuously monitoring the measured activity values, the scenarios can be modified dynamically to stay within predefined limits or to adjust to changing environmental conditions.

Total energy consumption over T for the chip is calculated as:

$$E = \int \Sigma_{modules}[a \cdot Cpd \cdot f \cdot V_{dd}^2] \cdot dt = \Sigma_{modules}[\Sigma_T(a \cdot)] \cdot Cpd \cdot f \cdot V_{dd}^2$$

where, f is the frequency, $V_{dd}$ is the supply voltage and a is the probabilistic (or measured, see discussion in connection with block 76 of this figure) activity. In other words, $\Sigma^T(a)*Cpd*f*V_{dd}^2$ is the energy corresponding to a particular hardware module characterized by equivalent dissipation capacitance Cpd; counters values give $\Sigma_T(a)$ and E is the sum of all energies for all modules in the distributed processing system 10 dissipated within T. Average system power dissipation W=E/T. In the preferred embodiment, measured and probabilistic energy consumption is calculated and the average power dissipation is derived from the energy consumption over period T. In most cases, energy consumption information will be more readily available. However, it would also be possible to calculate the power dissipation from measured and probabilistic power consumption.

Figure 4B:
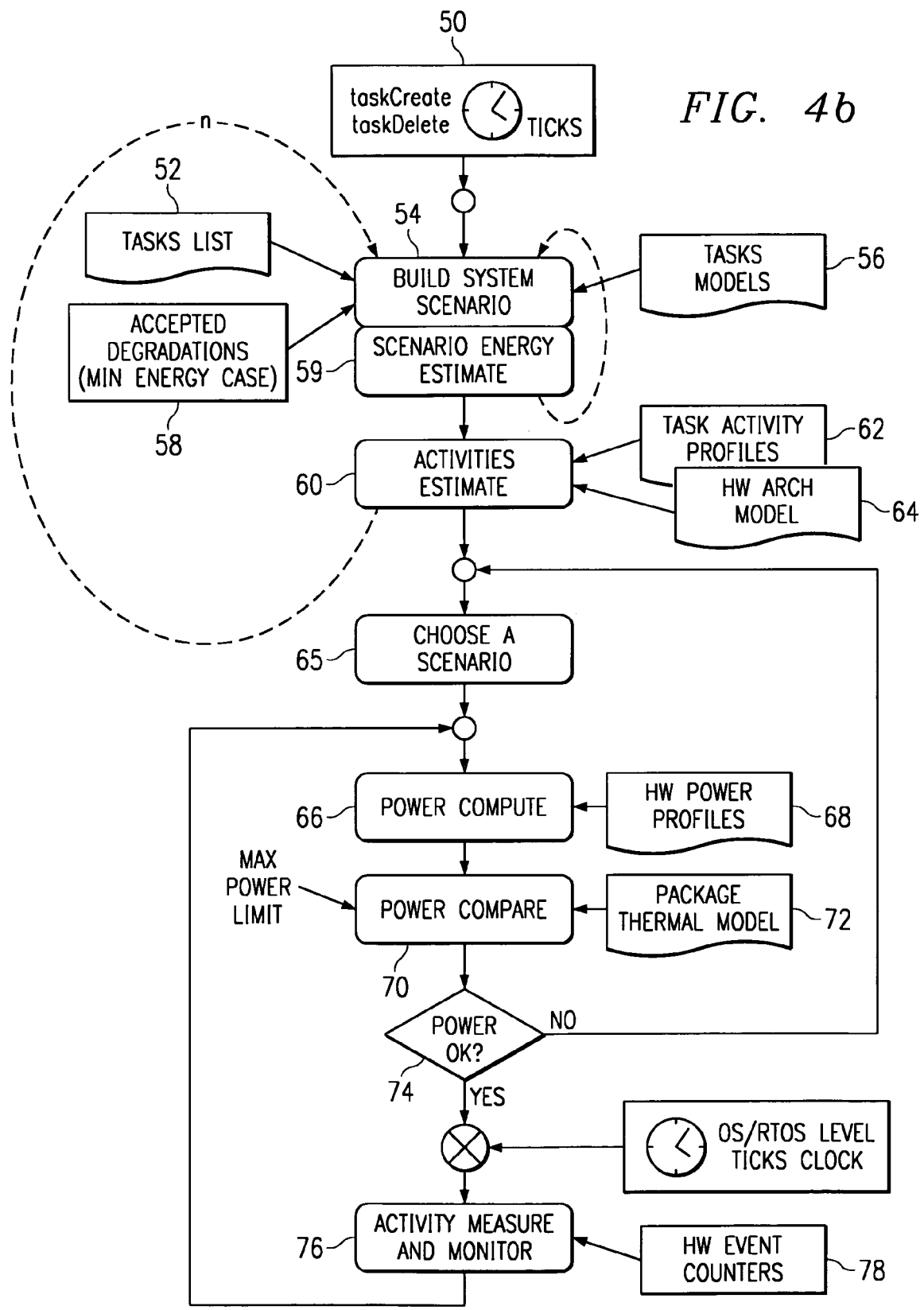

FIG. 4b is a flow chart describing operation of a second embodiment of the power management tasks 38. The flow of FIG. 4b is the same as that of FIG. 4I, except when the scenario construction algorithm is invoked (new task, task delete, real time event) in step 50, instead of choosing one new scenario, n different scenarios that match the performances constraints can be pre-computed in advance and stored in steps 54 and 59, in order to reduce the number of operations within the dynamic loop and provide faster adaptation if the power computed in the tracking loop leads to current scenario rejection in block 74. In FIG. 4b, if the scenario is rejected, another pre-computed scenario is selected in block 65. Otherwise the operation is the same as shown in FIG. 4a.

Figure 5:
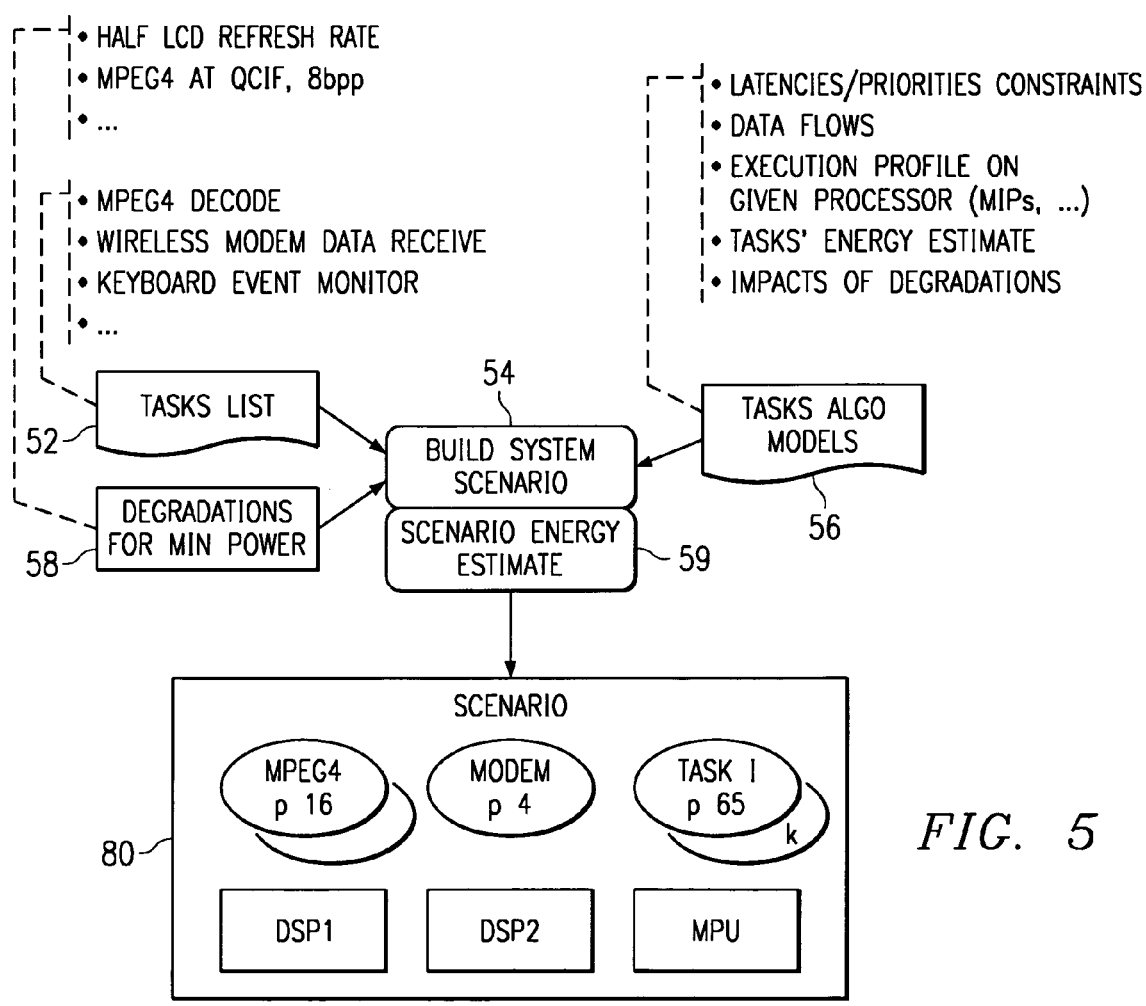
FIG. 5 illustrates the building system scenario block of FIG. 4.

FIGS. 5–8 illustrate the operation of various blocks of FIG. 3 in greater detail. The build system block 54 is shown in FIG. 5. In this block, a task list 52, a task model 56, and a list of possible task degradations 58 are used to generate a scenario. The task list is dependent upon which tasks are to be executed on the distributed processing system 10. In the example of FIG. 5, three tasks are shown: MPEG4 decode, wireless modem data receive and keyboard event monitor. In an actual implementation, the tasks could come from any number of sources. The task model sets forth conditions which must be taken in consideration in defining the scenario, such as latency and priority constraints, data flow, initial energy estimates, and the impact of degradations. Other conditions could also be used in this block. The output of the build system scenario block is a scenario 80, which associates the various tasks with the modules and assigns priorities to each of the tasks. In the example shown in FIG. 5, for example, the MPEG4 decode task has a priority of 16 and the wireless modem task has a priority of 4.

The scenarios built in block 54 could be based on a number of different considerations. For example, the scenarios could be built based on providing the maximum performance within the packages thermal constraints. Alternatively, the scenarios could be based on using the lowest possible energy. The optimum scenario could change during operation of a device; for example, with fully charged batteries a device may operate at a maximum performance level. As the power in the batteries diminished below a preset level, the device could operate at the lowest possible power level to sustain operation.

Figure 6:
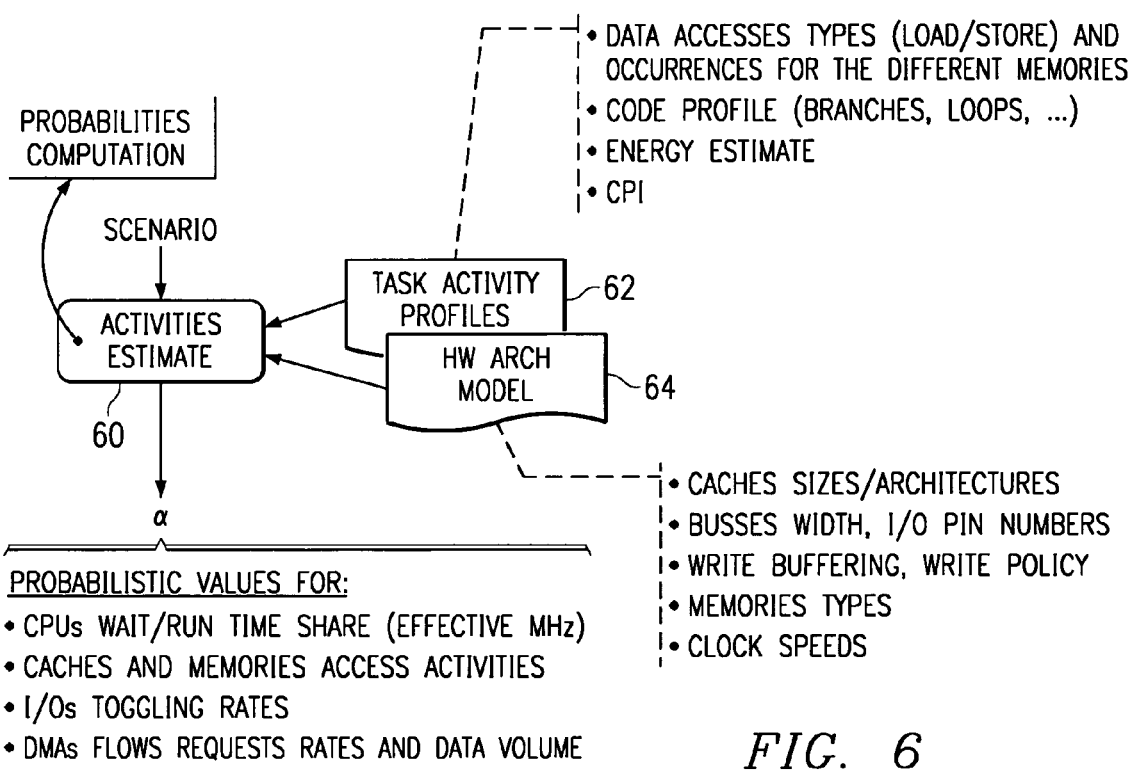
FIG. 6 illustrates the activities estimate block of FIG. 4.
Figure 7:
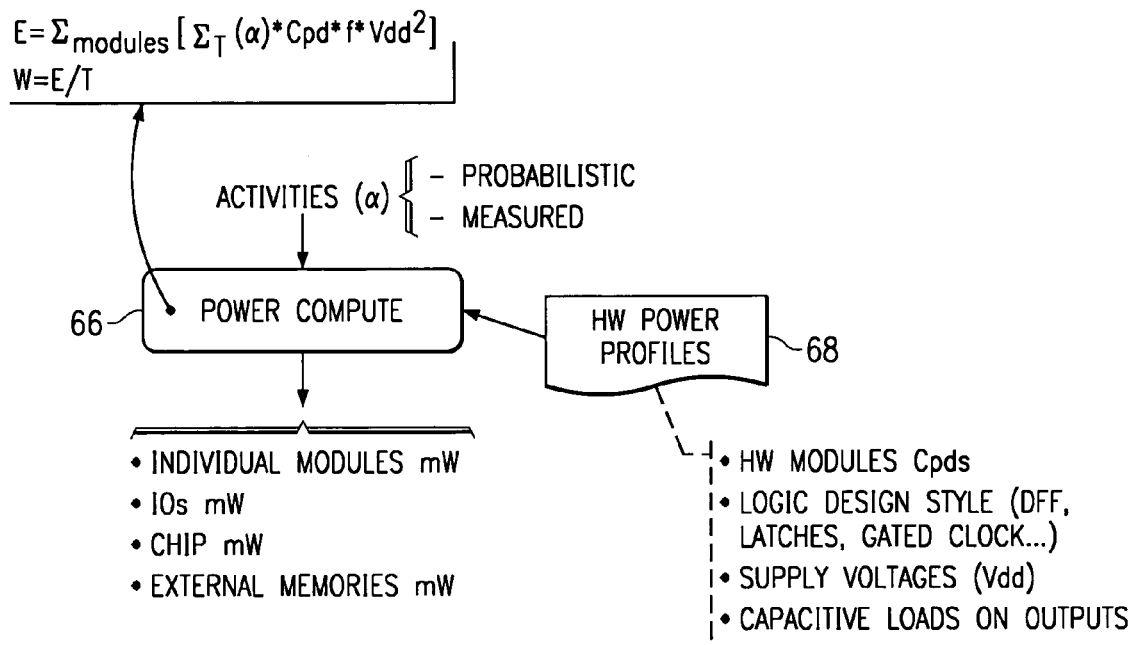
FIG. 7 illustrates the power compute block of FIG. 4.

The scenario 80 from block 54 is used by the activities estimate block 60, shown in FIG. 6. This block performs a probabilities computation for various parameters that affect power usage in the distributed processing system 10. The probabilistic activities estimate is generated in conjunction with task activity profiles 62 and hardware architectural models 64. The task activity profiles include information on the data access types (load/store) and occurrences for the different memories, code profiles, such as the branches and loops used in the task, and the cycles per instruction for instructions in the task. The hardware architectural model 64 describes in some way the impact of the task activity profiles 62 on the system latencies, that will permit computation of estimated hardware activities (such as processor run/wait time share). This model takes into account the characteristics of the hardware on which the task will be implemented, for example, the sizes of the caches, the width of various buses, the number of I/O pins, whether the cache is write-through or write back, the types of memories used (dynamic, static, flash, and so on) and the clock speeds used in the module. Typically, the model can consist of a family of curves that represent MPU and DSP effective frequency variations with different parameters, such as data cacheable/non-cacheable, read/write access shares, number of cycles per instruction, and so on. In the illustrated embodiment of FIG. 6, values for the effective frequency of each module, the number of memory accesses, the I/O toggling rates and the DMA flow are calculated. Other factors that affect power could also be calculated.

Figure 8:
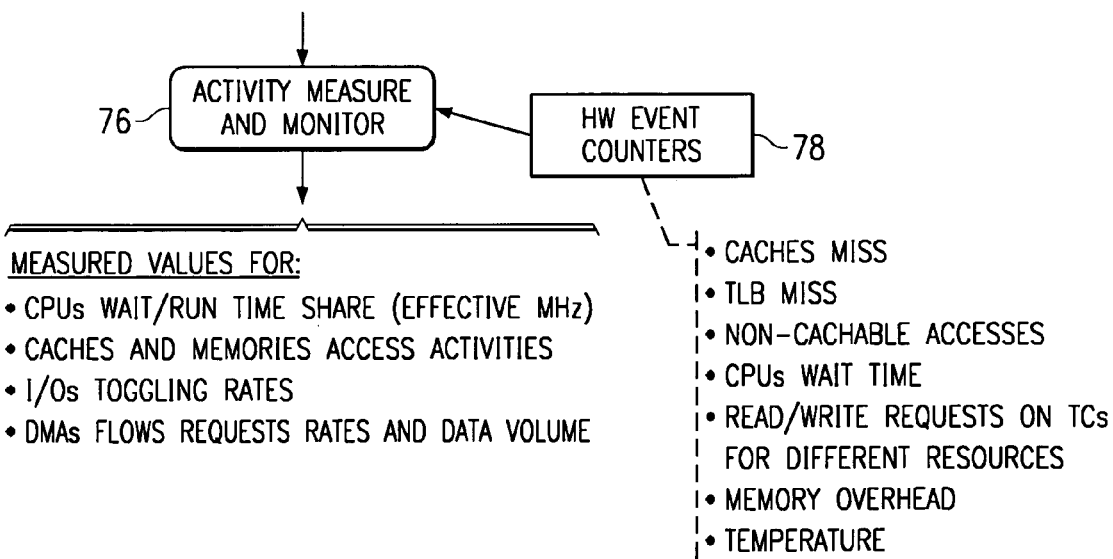
FIG. 8 illustrates the activity measure and monitor block of FIG. 4.

The power compute block 66 is shown in FIG. 8. In this block, the probabilistic activities from block 60 or the measured activities from block 76 are used to compute various energy values and, hence, power values over a period T. The power values are computed in association with hardware power profiles, which are specific to the hardware design of the distributed processing system 10. The hardware profiles could include a Cpd for each module, logic design style (D-type flip-flop, latches, gated clocks and so on), supply voltages and capacitive loads on the outputs. Power computations can be made for integrated modules, and also for external memory or other external devices.

Activity measure and monitor block 76 is shown in FIG. 8. Counters are implemented throughout the distributed processing system 10 to measure activities on the various modules, such as cache misses, TLB (translation lookaside buffer) misses, non-cacheable memory accesses, wait time, read/write requests for different resources, memory overhead and temperature. The activity measure and monitor block 76 outputs values for the effective frequency of each module, the number of memory accesses, the I/O toggling rates and the DMA flow. In a particular implementation, other values may also be measured. The output of this block is sent to the power compute block 66.

Figure 9:
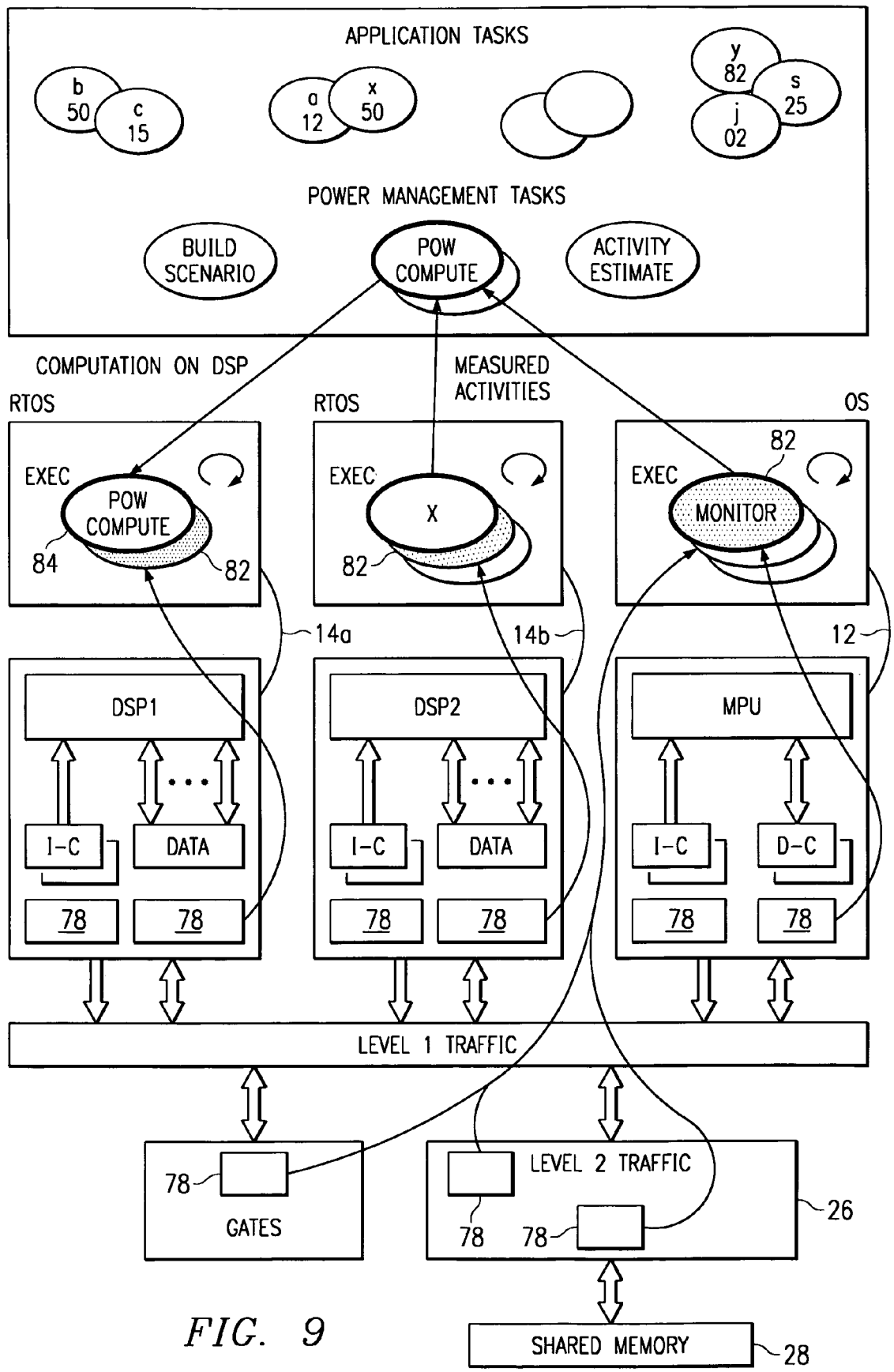
FIG. 9 illustrates a block diagram showing the distributed processing system with activity counters.

FIG. 9 illustrates and example of a distributed processing system 10 using power/energy management software. In this example, the distributed processing system 10 includes a MPU 12, executing an OS, and two DSPs 14 (individually referenced as DSP1 14*a* and DSP2 14*b*), each executing a respective RTOS. Each module is executing a monitor task 82, which monitors the values in various activity counters 78 throughout the distributed processing system 10. The power compute task is executed on DSP 14*a*. The various monitor tasks retrieve data from associated activity counters 78 and pass the information to DSP 14*a* to calculate a power value based on measured activities. The power management tasks, such as power compute task 84 and monitor task 82, can be executed along with other application tasks.

In the preferred embodiment, the power management tasks 38 and profiles 36 are implemented as JAVA class packages in a JAVA real-time environment.

The present invention provides significant advantages over the prior art. First, it provides for a fully dynamic power management. As the tasks executed in the distributed processing system 10 change, the power management can build new scenarios to ensure that thresholds are not exceeded. Further, as environmental conditions change, such as battery voltages dropping, the power management software can re-evaluate conditions and change scenarios, if necessary. For example, if the battery voltage (supply voltage) dropped to a point where Vdd could not be sustained at its nominal value, a lower frequency could be established, which would allow operation of the distributed processing system 10 at a lower Vdd. New scenarios could be built which would take the lower frequency into account. In some instances, more degradations would be introduced to compensate for the lower frequency. However, the lower frequency could provide for continued operation of the device, despite supply voltages that would normally be insufficient. Further, in situations where a lower frequency was acceptable, the device could operate at a lower Vdd (with the availability of a switched mode supply) in order to conserve power during periods of relatively low activity.

The power management software is transparent to the various tasks that it controls. Thus, even if a particular task does not provide for any power management, the power management software assumes responsibility for executing the task in a manner that is consistent with the power capabilities of the distributed processing system 10.

The overall operation of the power management software can be used with different hardware platforms, with different hardware and tasks accommodated by changing the profiles 36.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method for controlling the execution of tasks in a processor comprising a plurality of processing modules, comprising the steps of:
    generating a plurality of scenarios for executing a plurality of tasks scheduled for concurrent execution;
    calculating consumption information for said plurality of scenarios, the consumption information of each scenario based on probabilistic values for activities associated with the tasks;
    executing the tasks according to a selected one of said plurality of scenarios on said plurality of processing modules responsive to said consumption information.

2. The method of claim 1 and further comprising the steps of:
    monitoring actual activity occurrences in processing modules; and
    modifying the execution of the tasks based on said monitoring step.

3. The method of claim 1 wherein said executing step comprises the step of executing the tasks on said plurality of processing modules according to the scenario that provides the maximum performance within thermal constraints associated with the processing system.

4. The method of claim 1 wherein said executing step comprises the step of executing the tasks on said plurality of processing modules according to the scenario that provides the lowest possible energy consumption.

5. The method of claim 1 wherein said calculating step comprises the steps of:
    estimating the activities for each scenario;
    computing the consumption associated with said activities.

6. The method of claim 1 wherein said step of generating a task allocation scenario comprises the step of receiving a task list describing the tasks to be executed and a task model describing the tasks.

7. The method of claim 6 wherein the task model includes initial estimates for each task.

8. The method of claim 7 wherein the task model further includes priority constraints associated with the tasks.

9. The method of claim 8 wherein said task model includes information regarding possible degradations associated with one or more of the tasks in said task list.

10. The method of claim 5 wherein said computing step comprises the step of computing the energy consumption associated with said activities.

11. The method of claim 5 wherein said computing step comprises the step of computing the power consumption associated with said activities.

12. A processing device comprising:
    one or more processing modules for executing a plurality of tasks, said processing subsystems executing a power management function for;
    generating a plurality of scenarios for executing a plurality of tasks scheduled for concurrent execution;
    calculating consumption information for said plurality of scenarios, the consumption information of each scenario based on probabilistic values for activities associated with the tasks;
    controlling the execution of the tasks according to a selected one of said plurality of scenarios on said processing modules responsive to said consumption information.

13. The processing device of claim 12 and further comprising counters for measuring activity occurrences and wherein said power management function further:
    monitors said counters; and
    modifies the execution of the tasks based on values in said counters.

14. The processing device of claim 12 wherein said power management function controls the execution of tasks on the processing modules according to the scenario that provides the maximum performance within thermal constraints associated with the processing system.

15. The processing device of claim 12 wherein said power management function controls the execution of tasks on said processing modules according to the scenario that provides the lowest possible energy consumption.

16. The processing device of claim 12 wherein said power management function calculates the consumption information by:
    estimating the activities for each scenario;
    computing the consumption associated with said activities.

17. The processing device of claim 16 wherein said power management function computes the consumption by computing the energy consumption associated with said activities.

18. The processing device of claim 16 wherein said power management function computes the consumption by computing the power consumption associated with said activities.

19. The processing device of claim 12 wherein said power management function generates a task allocation scenario by receiving a task list describing the tasks to be executed and a task model describing the tasks.

20. The processing device of claim 19 wherein the task model includes initial estimates for each task.

21. The processing device of claim 20 wherein the task model further includes priority constraints associated with the tasks.

22. The processing device of claim 21 wherein said task model includes information regarding possible degradations associated with one or more of the tasks in said task list.

23. A method for controlling the concurrent execution of tasks in a processor comprising a plurality of processing modules, comprising the steps of:
    calculating consumption information based on probabilistic values for activities associated with the tasks by:
        generating a task allocation scenario based on a task list describing the tasks to be executed and a task model describing the tasks along with information regarding possible degradations associated with one or more of the tasks in said task list;
        estimating the activities for the task allocation scenario; and
        computing the consumption associated with said activities; and
    executing the tasks on said plurality of processing modules responsive to said consumption information.

24. A processing device comprising:
one or more processing modules for concurrently executing a plurality of tasks, said processing subsystems executing a power management function for:
    calculating consumption information based on probabilistic values for activities associated with the tasks by:
        generating a task allocation scenario based on a task list describing the tasks to be executed and a task model describing the tasks along with information regarding possible degradations associated with one or more of the tasks in said task list;
        estimating the activities for the task allocation scenario; and
        computing the consumption associated with said activities; and
    controlling the execution of the tasks on said processing modules responsive to said consumption information.

* * * * *